(12) United States Patent
Kaufman

(10) Patent No.: US 6,189,835 B1
(45) Date of Patent: Feb. 20, 2001

(54) APPARATUS FOR SPACECRAFT ANGULAR MOMENTUM CONTROL THROUGH THE USE OF REFLECTIVE THERMAL BLANKETS

(75) Inventor: David A. Kaufman, South Pasadena, CA (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/302,788

(22) Filed: Apr. 30, 1999

(51) Int. Cl.[7] ........................................ B64G 1/24
(52) U.S. Cl. ...................... 244/168; 244/158 R; 343/909
(58) Field of Search ........................... 244/158 R, 168, 244/173, 164; 343/909, DIG. 2; 136/292

(56) References Cited

U.S. PATENT DOCUMENTS

| | | | |
|---|---|---|---|
| 3,225,208 | * 12/1965 | Wolfe .................................. 244/173 |
| 4,684,084 | * 8/1987 | Fuldner et al. ....................... 244/168 |
| 4,894,125 | * 1/1990 | Fenolia et al. ....................... 244/173 |
| 5,305,971 | * 4/1994 | Decanini .............................. 244/168 |
| 5,373,305 | * 12/1994 | Pepore, Jr. et al. ................. 343/909 |
| 5,618,012 | * 4/1997 | Lehner et al. ....................... 244/168 |
| 5,775,645 | * 7/1998 | Yocum, Jr. et al. ................. 244/168 |
| 6,102,336 | * 8/2000 | Cande ................................. 244/168 |

* cited by examiner

Primary Examiner—Galen L. Barefoot
(74) Attorney, Agent, or Firm—Terje Gudmestad

(57) ABSTRACT

A spacecraft having a pair of asymmetrical side-mounted antennas that are designed to control the net angular momentum of the spacecraft over a twenty-four hour period. One of the side-mounted antennas is a dual surface antenna having a front surface that has a reflective sunshield overlay thereon and a rear surface. The rear surface of this side mounted antenna has a reflective blanket attached directly to the rear surface of the antenna that has low-$\alpha$ properties to control the solar or radiation force acting on the spacecraft.

20 Claims, 3 Drawing Sheets

US 6,189,835 B1

APPARATUS FOR SPACECRAFT ANGULAR MOMENTUM CONTROL THROUGH THE USE OF REFLECTIVE THERMAL BLANKETS

TECHNICAL FIELD

The present invention relates generally to an apparatus for controlling angular momentum build up of a spacecraft. More specifically, the present invention relates to an apparatus for controlling angular momentum build up of a spacecraft by tailoring the surface properties of the side mounted antennas.

BACKGROUND ART

Conventional spacecraft designs attempt to minimize the amount of angular momentum build up and therefore minimize the size of the momentum storage system and the number of momentum dumping operations required to dispose of any momentum build up. Spacecraft with larger momentum storage systems are heavier than those with smaller storage systems. Further, momentum dumping operations require utilization of fuel resources and thus increase the operational costs of the spacecraft and its complexity.

These spacecraft designs also use protective devices, such as thermal blankets, on the large side-mounted reflectors to provide thermal protection for the reflectors. Conventional thermal blanket designs utilize carbon-loaded (black) blankets on the back side of the reflectors and a Germanium-coated (reflective) sunshield on the front surface of the reflector. For a spacecraft with the same reflector design on both sides of the spacecraft, the surface properties of each one of the pair of reflectors are symmetric.

FIG. 1 illustrates an example of a conventional spacecraft 10 having a spacecraft body 12 and symmetric right and left reflectors 14, 16. Each of the reflectors 14, 16 are dual surface antennas that have a sunshield on a respective front surface 18 and a black reflective blanket on a respective back surface 20. As the spacecraft 10 rotates throughout a twenty-four hour period, sunlight illuminates all sides of the spacecraft 10. The solar pressure acting on the spacecraft 10 is larger on the reflective front surfaces 18 than the black back surfaces 20. As the designs of the reflectors 14, 16 are symmetric, the solar-induced torque on the spacecraft 10 is balanced as it rotates over a twenty-four hour period. As the solar pressure is balanced, the resulting net angular momentum build up about the y-axis is zero.

For a spacecraft with asymmetric reflector designs, such as a bare graphite left reflector (black on both surfaces) and a blanketed right reflector (reflective front surface and black back surface), the solar pressure on the reflective front surface of the right antenna is greater than on the black front surface of the left antenna. As the spacecraft rotates over a twenty-four hour period, there is a net build up of angular momentum due to the unbalanced pressure on the front side of the left reflector. With this configuration, the angular momentum can quickly exceed the momentum storage capability of the spacecraft thus requiring more frequent angular momentum dumping operations on-orbit.

SUMMARY OF THE INVENTION

It is therefore an object of the present invention to provide an apparatus for tailoring the surface properties of the front and back surfaces of the side mounted antennas of a spacecraft for controlling angular momentum build up.

It is a further object of the present invention to provide a reflective antenna thermal blanket design that counteracts imbalances in the solar or radiated RF power from the side-mounted antennas.

In accordance with the objects of the present invention, a spacecraft having a pair of side-mounted reflectors that are asymmetrically designed is provided. One of the pair of side-mounted reflectors is smaller in size than the other of the side-mounted reflectors. The other of the side-mounted reflectors is positioned on the opposing side of the spacecraft and has a front surface and a rear surface with the front surface having a Germanium-coated sunshield overlay thereon and the rear surface having an antenna blanket positioned thereon. The antenna blanket has an inner layer attached to the rear surface of the other side-mounted reflector and an outer layer attached to the inner layer which has low solar absorptivity ($\alpha$) to control the solar pressure on the spacecraft such that over a twenty-four hour period, the angular momentum build up of the spacecraft is approximately a net zero.

Additional advantages and features of the present invention will become apparent from the description that follows, and may be realized by means of the instrumentalities and combinations particularly pointed out in the appended claims, when taken in conjunction with the accompanying drawings.

BEST MODES FOR CARRYING OUT THE INVENTION

Figure 1:
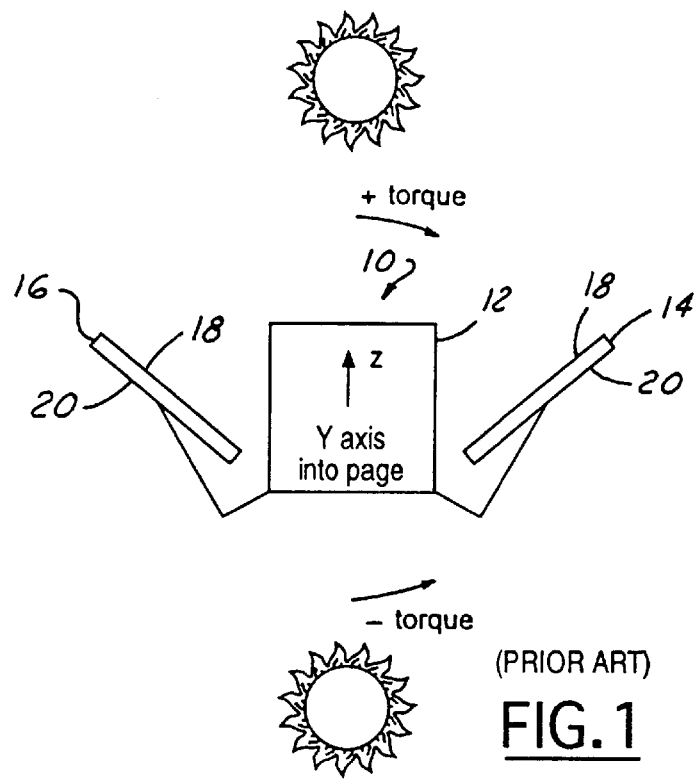
FIG. 1 is a schematic illustration of a spacecraft having a symmetric antenna design in accordance with prior art spacecraft designs.
Figure 2:
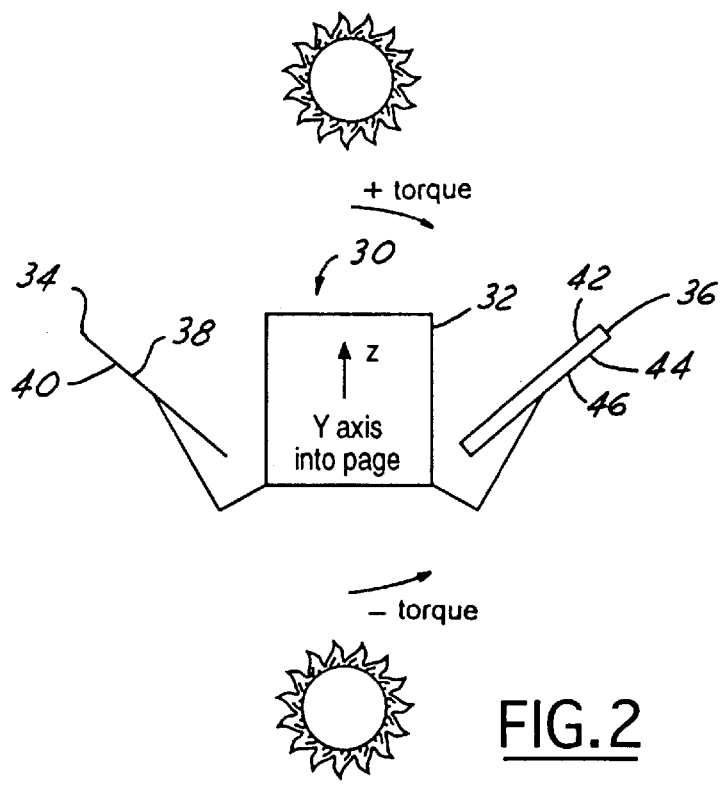
FIG. 2 is a schematic illustration of a spacecraft having an asymmetric antenna design utilizing a corrective blanket in accordance with a preferred embodiment of the present invention.

FIG. 2 illustrates a spacecraft 30 in accordance with a preferred embodiment of the present invention. The spacecraft 30 includes a spacecraft body 32 having a left side-mounted reflector 34 and a right side-mounted reflector 36. The illustrated left reflector 34 is a bare graphite single surface antenna which is black on both its front surface 38 and its back surface 40. As the left antenna 34 is comprised of bare graphite, no thermal blankets are required for protection thereof. The right antenna 36 is a dual surface antenna having a front surface 42 that is covered with a reflective coating, such as a Germanium sunshield and a rear surface 44. The rear surface 44 of the right antenna 36 preferably has a reflective blanket 46 or other reflective surface coating positioned thereon. The left antenna 34 is smaller in size than the right antenna 36. It should be understood that the orientation of the reflectors is merely for illustration purposes and the terms "left" and "right" are not intended to be limiting.

Figure 5:
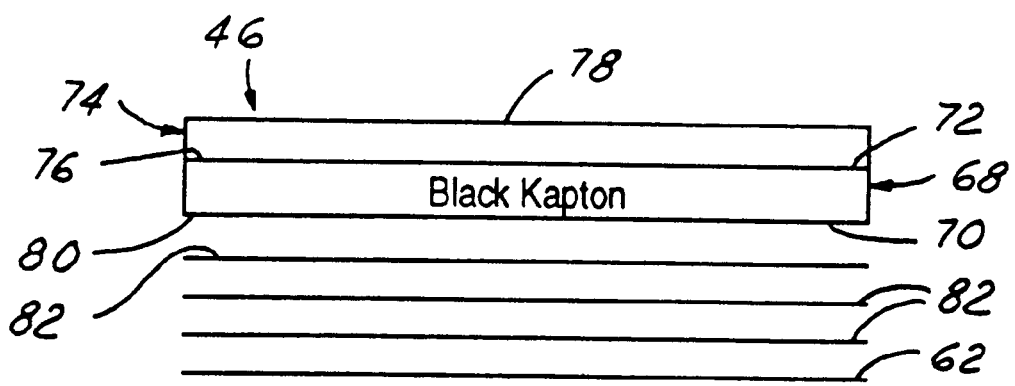
FIG. 5 is a schematic illustration of a reflective blanket design in accordance with a preferred embodiment of the present invention.

The antenna blanket 46 schematically shown in FIG. 2, and shown in more detail in FIG. 5, is intended to replace all or part of the standard black blankets, which have high solar absorpivity. The disclosed antenna blanket 46 has a low solar absorpivity ($\alpha$) in order to control the solar pressure on the spacecraft 30. The reflective blanket 46 is preferably a Germanium coated Kapton or a white painted Kapton having low-$\alpha$ properties, however other reflective blankets may be utilized.

The design of the spacecraft 30 and side mounted antennas 34 and 36, shown in FIG. 2, are such that the solar pressure on the reflective front surface 42 and reflective back surface 44 of the right antenna 36 is approximately equal. Further, the solar pressure is also approximately equal on the front surface 38 and rear surface 40 of the left antenna 34. As the spacecraft 30 rotates, sunlight illuminates all sides of the spacecraft. As the solar pressure acting on both sides of each antenna 34, 36 is approximately equal, positive solar induced torque on the spacecraft 30 about the y-axis near local midnight is cancelled by negative torque on the spacecraft 30 about the y-axis near local noon. Therefore, after a given twenty-four hour period, there is a minimal net increase in the angular momentum of the spacecraft 30.

Figure 3:
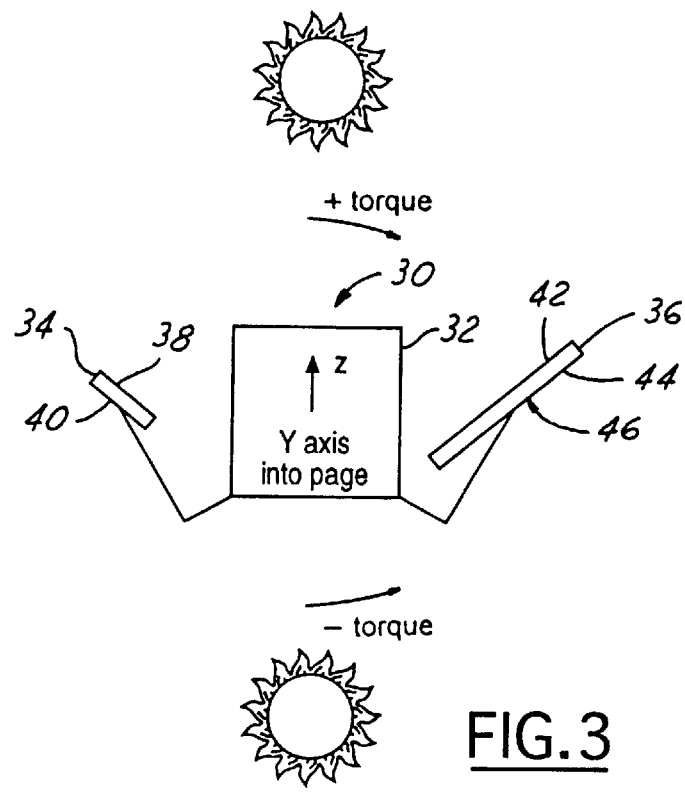
FIG. 3 is a schematic illustration of a spacecraft having an alternative asymmetric antenna design utilizing a corrective blanket in accordance with another preferred embodiment of the present invention.

FIG. 3 illustrates another embodiment of the spacecraft 30 with an alternative asymmetric antenna design in accordance with the present invention. The spacecraft 30 has a spacecraft body 32 which rotates about a y-axis. The spacecraft body 32 has a left antenna 34 and a right antenna 36 extending therefrom which are asymmetric in size. The left antenna 34 is preferably a small dual surface antenna having a reflective front surface 38 and a rear surface 40 having a black thermal blanket with high solar absorptivity. Alternatively, the left antenna 34 may be omitted or absent altogether. The right antenna 36 is a dual surface antenna having a front surface 42 preferably covered by a Germanium reflective sunshield and a rear surface 44 which is covered by a reflective blanket 46 having low solar absorptivity, as discussed in more detail above and below. It should be understood that the left antenna 34 can have any combination of front/back surface properties, so long as it is smaller in size than the right antenna 36, such as shown in FIGS. 2 and 3.

In accordance with this design, the solar pressure force on the right antenna 36 is greater than the solar pressure force on the smaller left antenna 34. In the extreme case where no left antenna 34 is included, the solar pressure force on the right antenna 36 will obviously be greater. The solar pressure acts approximately equally on the reflective front surface 42 and reflective back surface 44 of the right antenna 36. As the spacecraft rotates, sunlight illuminates all sides thereof and a positive solar induced torque on the spacecraft 30 about the y-axis near local midnight is cancelled by negative torque about the y-axis near local noon as indicated by the arrows in the drawings. Accordingly, after a twenty-four hour period there is a minimal net increase in the angular momentum of the spacecraft 30.

Figure 4:
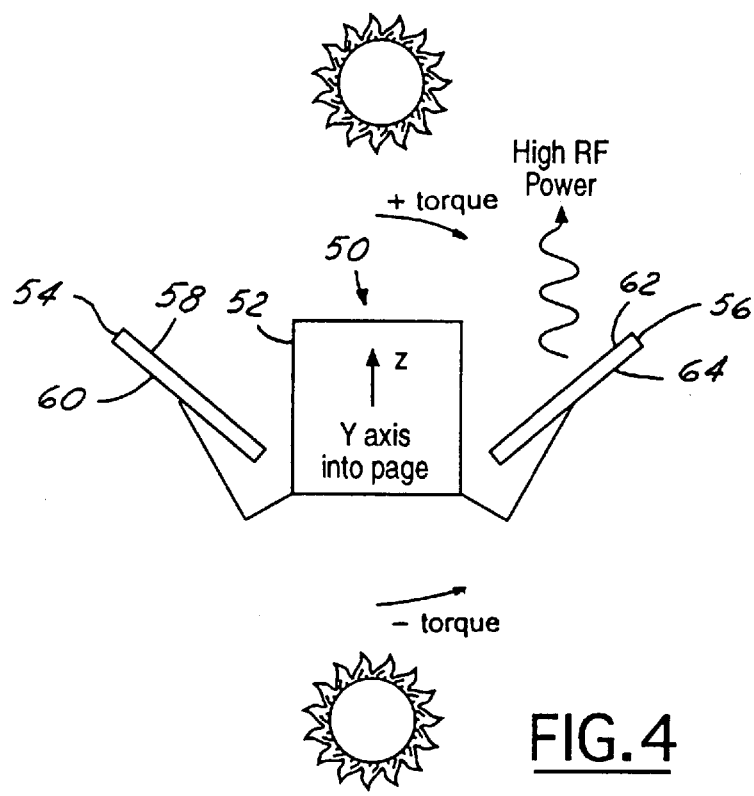
FIG. 4 is a schematic illustration of a spacecraft having an asymmetric RF power antenna design and utilizing a corrective blanket in accordance with a preferred embodiment of the present invention.

FIG. 4 illustrates an alternative embodiment of a spacecraft 50. The spacecraft 50 has a spacecraft body 52 and pair of side mounted antennas 54 and 56 which are symmetric in size. The left antenna 54 has a front surface 58 having a reflective Germanium sunshield coating thereon and a rear surface 60 having a conventional black Kapton thermal blanket positioned thereon. The right antenna 56 has a front surface 62 having a reflective Germanium sunshield overlay thereon and a rear surface 64 having a reflective blanket with low solar absorptivity in accordance with the present invention thereon.

While the spacecraft 50 has antennas 54 and 56 which are symmetric in size, they are asymmetric in RF power. The RF radiation pressure force on the right (high power) antenna 56 is greater than on the left (low or zero power) antenna 54. The solar pressure is greater on the reflective front surface 58 of the left antenna 54 then on the black back surface 60. The solar pressure on the reflective front surface 62 of the right antenna 56 is balanced with respect to the reflective back surface 64 of the right antenna 56.

As the spacecraft rotates about the y-axis, sunlight illuminates all sides thereof. A positive RF induced torque on the spacecraft 50 about the y-axis is cancelled by a negative solar torque near local noon. The area of the reflective blanket can be tailored to counteract different amounts of RF imbalance and therefore impact the strength of the torque. Accordingly, after twenty-four hours, there is a minimal net increase in the angular momentum of the spacecraft 50.

FIG. 5 is a schematic illustration of a reflective blanket 46 in accordance with the present invention. The reflective blanket 46, as shown in the figures and as described above, preferably includes one or more inner layers 68 which is comprised of Mylar or Kapton with a vapor deposited aluminum (VDA) coating, or black Kapton. The inner layer 68 may, however, be any other applicable material. The inner layer 68 has a first surface 70 which is secured to the rear surface 62 of the right antenna 54 (FIG. 4) or to the first surface 80 of another inner layer 82. It should be understood that the reflective blanket 46 could have up to twelve inner layers. Alternatively, the inner layers could be omitted altogether. The inner layer 68 has a second surface 72 which is disposed away from the rear surface 62. The reflective blanket design 46 also has an outer layer 74 which has a first surface 76 attached to the second surface 72 of the inner layer 68 and a second surface 78 comprised of a reflective layer having low solar absorpivity ($\alpha$) characteristics. If no inner layer 68 is present, the second surface 78 is attached to the rear surface 62. It should be understood that the design of the reflective blanket 46 is applicable to all embodiments.

As discussed above, the reflective layer may be white paint or Germanium. However, the reflective layer may also be a Germanium coated yellow Kapton or any other reflective coating with low solar absorpivity ($\alpha$). As is well known, bare graphite has an absorptivity of approximately .88 while a black Kapton blanket has an absorptivity of approximately 0.95. The absorptivity ($\alpha$) of the second layer 68 of the thermal blanket 46 is preferably in the range of 0.45 to 0.54. However, any thermal blanket utilizing a coating which has a solar absorpivity of 0.8 or below may be utilized in accordance with the present invention.

Having now fully described the invention, it will become apparent to one of ordinary skill in the art that many changes and modifications can be made thereto without departing from the spirit or scope of the invention as set forth herein.

What is claimed is:

1. A system for minimizing the net angular momentum of a spacecraft comprising:
   a spacecraft body;
   a first antenna mounted to a side of said spacecraft body;
   a second antenna mounted to an opposing side of said spacecraft body;
   said first and second antennas being configured such that a larger force acts on said second antenna than on said first antenna during a twenty-four hour period; and a reflective antenna blanket positioned on a back surface of said second antenna, to balance said larger force, said reflective antenna blanket having an inner layer attached to said back surface and an outer reflective layer attached to said inner layer.

2. The system as recited in claim 1, wherein said outer reflective layer has a solar absorptivity between the range of 0.01 and 0.7.

3. The system as recited in claim 2, wherein said outer reflective layer is a white paint.

4. The system as recited in claim 2, wherein said outer reflective layer is comprised of a Germanium coating.

5. The system as recited in claim 2, wherein said force acting on said second antenna is a solar pressure force.

6. The system as recited in claim 5, wherein said first antenna is a bare graphite single surface antenna.

7. The system as recited in claim 5, wherein said first antenna is a single surface antenna and is smaller than said second antenna.

8. The system as recited in claim 2, wherein said force acting on said second antenna is a RF radiation pressure force.

9. A spacecraft having a substantially zero net angular momentum over a twenty-four hour period, comprising:
   a spacecraft body;
   a first reflector having a front surface and a rear surface in communication with said spacecraft body;
   a second reflector having a front surface and a rear surface in communication with said spacecraft body;
   said first reflector and said second reflector being asymmetric in design such that a larger force acts on said front surface of said second reflector than on said front surface of said first reflector during a first twelve hour period;
   a thermal reflective blanket positioned on said rear surface of said second reflector, said reflective blanket having low solar absorpivity to counter-balance said larger force during a second twelve hour period.

10. The spacecraft body as recited in claim 9, wherein said thermal reflective blanket has a solar absorpivity between the range of 0.01 and 0.7.

11. The spacecraft body as recited in claim 10, wherein said thermal reflective blanket has a first layer attached to said rear surface of said second reflector and a second layer attached to said first layer.

12. The spacecraft as recited in claim 11, wherein said inner layer is constructed of black Kapton.

13. The spacecraft as recited in claim 12, wherein said outer reflective layer is a white paint.

14. The spacecraft as recited in claim 12, wherein said outer reflective layer is constructed of a Germanium coating.

15. The spacecraft as recited in claim 11, wherein said inner layer is constructed of VDA Kapton.

16. The spacecraft as recited in claim 11, wherein said larger force is a solar pressure force.

17. The spacecraft as recited in claim 11, wherein said larger force is a RF radiation pressure force.

18. The spacecraft as recited in claim 16, wherein said first reflector and said second reflector have generally the same dimensions with said first reflector having a bare black graphite front and back surface.

19. The spacecraft as recited in claim 16, wherein said first reflector is smaller in size than said second reflector.

20. A method for minimizing the net angular momentum of a spacecraft over a twenty-four hour period comprising the steps of:
   providing a spacecraft body;
   providing a pair of antennas extending from opposing sides of said spacecraft body, said antennas being asymmetric in design;
   applying a force on a front surface of one of said pair of antennas which is larger than a force simultaneously applied to a front surface of said other of said pair of antennas such that a net angular momentum is generated about an axis of said spacecraft body during a first twelve hour period; and
   counterbalancing said larger force on said front surface by applying a thermal reflective blanket on a rear surface of said one of said pair of antennas, said thermal reflective blanket having a low solar absorpivity such that a force acts on said rear surface during a second twelve hour period to provide a net zero angular momentum over a twenty four hour period.

* * * * *